(12) United States Patent
Kuczera

(10) Patent No.: US 6,561,911 B2
(45) Date of Patent: May 13, 2003

(54) MOUNTING SYSTEM FOR A FLEXIBLE DRIVELINE COUPLING

(75) Inventor: Ramon C. Kuczera, Clarkston, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/951,818

(22) Filed: Sep. 12, 2001

(65) Prior Publication Data

US 2003/0050123 A1 Mar. 13, 2003

(51) Int. Cl.$^7$ ................................................. F16D 3/56
(52) U.S. Cl. .......................................... 464/93; 464/137
(58) Field of Search .......................... 469/87, 93, 137; 464/147

(56) References Cited

U.S. PATENT DOCUMENTS

| | | | | |
|---|---|---|---|---|
| 2,854,265 A | * | 9/1958 | Lucia | ........................ 464/137 |
| 3,478,539 A | * | 11/1969 | Daur | ........................... 464/89 |
| 4,114,472 A | * | 9/1978 | Hornig et al. | ............... 464/180 |
| 4,729,753 A | * | 3/1988 | Neathery et al. | ............ 416/102 |
| 4,834,041 A | * | 5/1989 | Valev | ....................... 123/192.1 |
| 6,068,555 A | * | 5/2000 | Andra et al. | ................. 464/180 |

* cited by examiner

Primary Examiner—Lynne H. Browne
Assistant Examiner—Kenn Thompson
(74) Attorney, Agent, or Firm—Mick A. Nylander

(57) ABSTRACT

A centering flange for use in mating shafts. The centering flange including a body. The body having a pole extending from one end thereof. The centering flange also including a plurality of lobes extending from the body equidistantly arrange around a perimeter of the body. The centering flange also including a circumferential recess on the side of the body opposite the pole. The integrated centering flange is used for mating a propshaft of an automotive vehicle to a driveline module.

1 Claim, 4 Drawing Sheets

MOUNTING SYSTEM FOR A FLEXIBLE DRIVELINE COUPLING

BACKGROUND OF THE INVENTION

1. Technical Field

The present invention relates generally to a driveline for a vehicle, and more particularly to the mounting and centering of a propshaft with an axle module.

2. Background Art

Drivetrain systems for vehicles have been known for many years. The drivetrain system generally includes an engine, a transmission, and a front and rear differential connected by a propshaft. Halfshafts connect the wheels to the differentials in the typical drivetrain system. The four general drive train systems are front wheel drive, rear wheel drive, all-wheel drive, and four wheel drive.

Drivetrain systems are generally distinguished by the delivery of power to a different combination of drive wheels, i.e. front drive wheels, rear drive wheels, or some combination of both. In addition to delivering power to a particular combination of drive wheels, most drivetrain systems permit the driven wheels to rotate at different speeds. This allows the outside wheels to rotate faster then the inside wheels on a turn and the front wheels to rotate faster than the rear drive wheels during straight line speed. An all wheel drive vehicle generally will deliver power to both the front and rear axles at all times. During a slip condition at one wheel more torque will be delivered to the axle in the non slip condition until the drivetrain returns to an equilibrium state. Some prior art all-wheel drive systems monitor each wheel separately and send power to each depending on its current state as determined by numerous sensors. A four wheel drive system generally is primarily rear or front wheel drive and only delivers power to the secondary or "hang-on" axle when necessary.

Usually with the hang on or all wheel drive vehicle drive train systems a propeller shaft or driveshaft is needed between the front axle and the rear axle of the vehicle. This creates many packaging and installation constraints that are imposed upon the propshaft. The installation of the propshaft into the vehicle at the manufacturing facility must be done in limited space and in a very short time frame. Prior art systems have used a propshaft that has a centering device that included an appendage extending from a rear and or front axle module. The centering appendage had to be aligned with a receiving notch on the propshaft or driveshaft being installed to the axle module. However, with the above identified packaging difficulties found underneath the frame of the vehicle, the propshaft is difficult to install because of the angle needed to align the appendage with the notch between the propshaft and the axle module. Furthermore, reduction of the required time frame to install the propshaft to the rear axle module and greater emphasis on the installation of the propshaft to the rear axle module being done in an accurate and complete manner, adds pressure to the installation process. There have been attempts to readjust or redesign the centering appendage and the propshaft but still the angle needed to mount the propshaft to the rear axle module is too great and there has become a need in the art for a new method of centering the propshaft to the rear axle module.

Therefore, there is a need in the art for a modified mounting system for a flexible driveline coupling that allows centering and installation in a limited installation space and time.

BRIEF SUMMARY OF THE INVENTION

One object of the present invention is to provide an improved driveline system for a vehicle.

Yet another object of the present invention is to provide a new mounting method for a driveline propshaft.

Still a further object of the present invention is to provide a flexible coupling to mount an integrated centering flange thereto for use in mounting a propshaft to a vehicle driveline module.

Still another object of the present invention is to provide a means to mount a propshaft to a driveline module that requires less angle of attachment then prior art systems.

Still a further object of the present invention is to provide an integrated centering flange for use in mounting a propshaft to a driveline module that will reduce the time and effort of manufacturing.

It is still a further object of the present invention to provide a way of connecting a propshaft to a driveline module that will eliminate packaging difficulties of the vehicle.

To achieve the foregoing objects a centering flange for use in mating a shaft to a driveline module is disclosed. The centering flange includes a body, and an appendage extending from one end of the body. The centering flange also includes a plurality of lobes extending from the body equidistantly arranged around the perimeter of the body. The centering flange also includes a circumferential recess on a side of the body opposite the appendage. The centering flange is connected to a flexible coupling on one end thereof while the other end is connected to a housing flange connected to the driveline module.

One advantage of the present invention is that it provides an improved driveline module for a vehicle.

Another advantage of the present invention is that it provides an integrated centering flange for use in connecting a propshaft to a driveline module.

Still another advantage of the present invention is that it provides a method of installing the propshaft to the driveline module with a reduced angle of attachment.

Still another advantage of the present invention is that the integrated centering flange allows for a quicker installation period thus increasing manufacturing productivity.

Yet another advantage of the present invention is that the integrated centering flange reduces the packaging necessary for the driveline module and the propshaft within the driveline space.

Other objects, features and advantages of the present invention will become apparent from the subsequent description and the appended claims, taken in conjunction with the accompany drawings.

DESCRIPTION OF THE PREFERRED EMBODIMENT(S)

Figure 1:
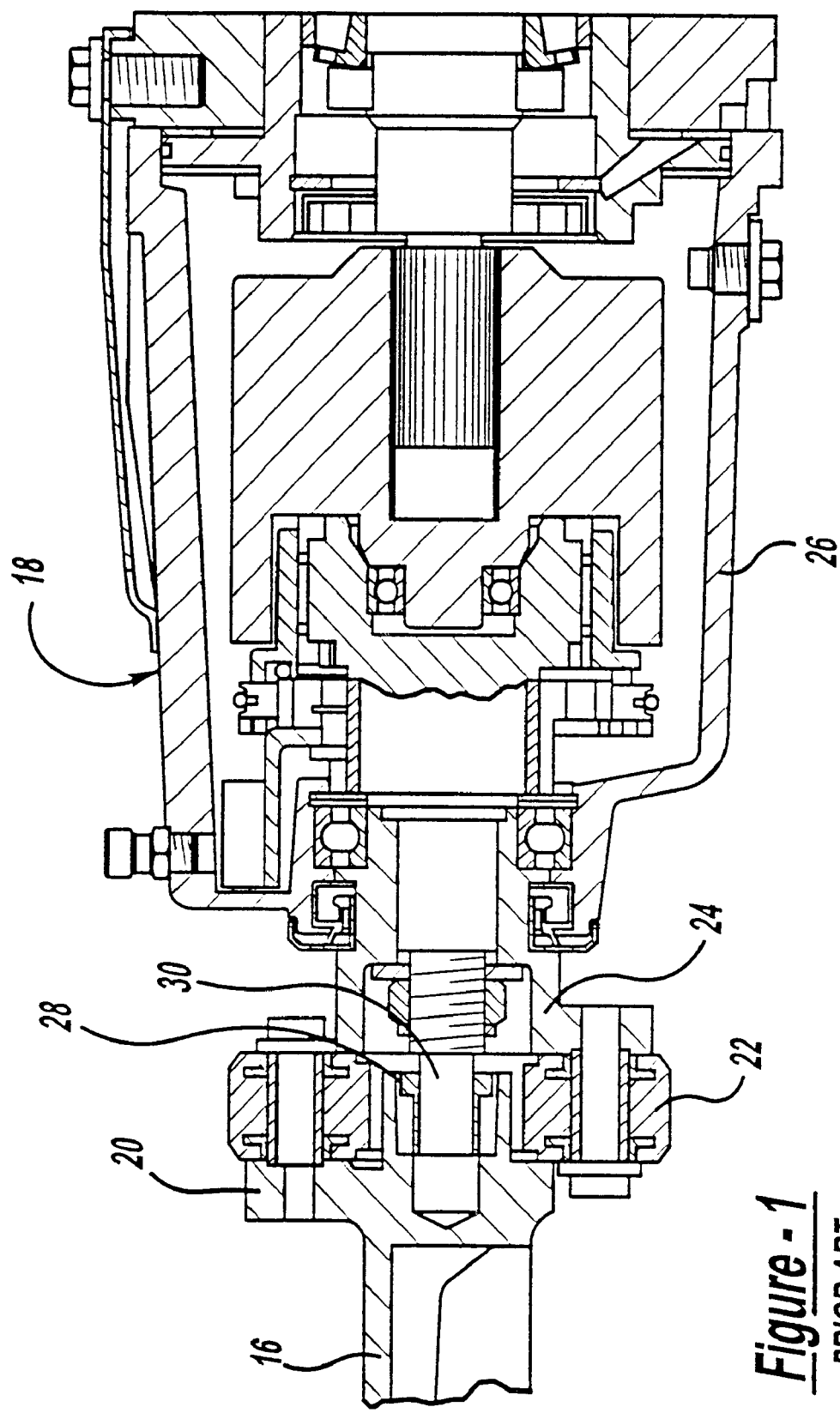
FIG. 1 shows a prior art mounting arrangement of a propshaft to a driveline module.

Referring to the drawings, an integrated centering flange 10 according to the present invention is shown. The integrated centering flange 10 generally is used to connect a propeller or driveshaft 12 in an automotive vehicle to either a rear or front driveline module 14. In the preferred embodiment the propshaft 12 is connected to the rear module 14 and transfers power from the engine (not shown), or a transmission (not shown) to the rear wheels of the automotive vehicle. It should be noted that the invention can be used on any known propshaft to driveline connection and can be used either on an all wheel drive, four wheel drive, rear wheel drive or front wheel drive vehicle. The mounting is robust and strong enough to be able to withstand the normal wear and tear of the rotational speeds necessary for the propshaft 12 to spin the driveline module 14 and the wheels.

FIG. 1 shows an example of a prior art design used to connect a propshaft 16 with a driveline module 18. The propshaft 16 has a flange 20 on one end. Connected to the flange 20 of the propshaft 16 is a flexible coupling 22 which is connected by any known securing device such as a bolt. The opposite side of the flexible coupling 22 has a housing flange 24 connected thereto. The housing flange 24 is rotationally supported within a driveline module housing 26. This arrangement allows the rotational energy to pass directly from the propshaft 16 to the driveline module 18 through a differential and on to the wheels of the automotive vehicle. The flexible coupling 22 is generally made of a rubber material and allows for small angles of difference, between the propshaft 16 and the driveline module 18, to occur during operation of the automotive vehicle. The prior art system also includes a cavity 28 at a center point of the propshaft flange 20. The cavity 28 generally has a circular shape. The housing flange 24 has a post 30 extending from a center point of its flange 24. When mounting a prior art propshaft 16 to the driveline module 18, the post 30 of the housing flange 24 is aligned with and received by the cavity 28 of the propshaft flange 20. Next, a plurality of securing devices are alternately connected between the flexible coupling 22 and the propshaft flange 20 and the flexible coupling 22 and the housing flange 24. This creates a rotationally fixed junction between the propshaft 16 and driveline module 18. The post 30 mating with the cavity 28 allows for proper alignment of the propshaft 16 to the driveline module 18 to ensure proper balancing of the drive train system. The flexible coupling 22 allows for a variation in the angle of the propshaft 16 with relation to the driveline module 18. The angles that are capable of being withstood by the flexible coupling 22 can vary in range from 0° to 8° degrees from the center line of the driveline module 18.

The prior art system along with the system according to the present invention has many packaging and installation requirements imposed on the propshaft and driveline module systems. Generally, in a manufacturing facility the installation of the driveline products including the propshaft and related hardware is done in limited space and is required to be done in a very short time frame. These restrictions raise issues concerning the ease of assembly of the driveline product into the vehicle. Specifically, the angles needed to align the propshaft 16 with the driveline module 18 and to center the propshaft 16 properly on the driveline module 18 can create undo expense in the manufacturing process. With the prior art aligning system the post 30 extending from the driveline module 18 has to be properly inserted into the receiving cavity 28 of the propshaft flange 20. However, the angle necessary to create this engagement between the post 30 and the cavity 28 makes the connection difficult to accomplish within a limited time frame, and also within the limited space available, due to packaging issues under the automotive vehicle for the drive train assembly. There have been a variety of methods and attempts by manufacturers to secure the propshaft 16 to the drivetrain module 18 and to ensure that it is aligned correctly, i. e., any necessary means including physical movement and bending or contorting of the necessary parts. The difficulty installing the propshaft 16 with the prior art mounting method and centering device makes installation a challenge for manufacturers and slows down the production. This reduces the effectiveness and raises the cost of installing the propshaft and driveline systems into the vehicles.

Figure 2:
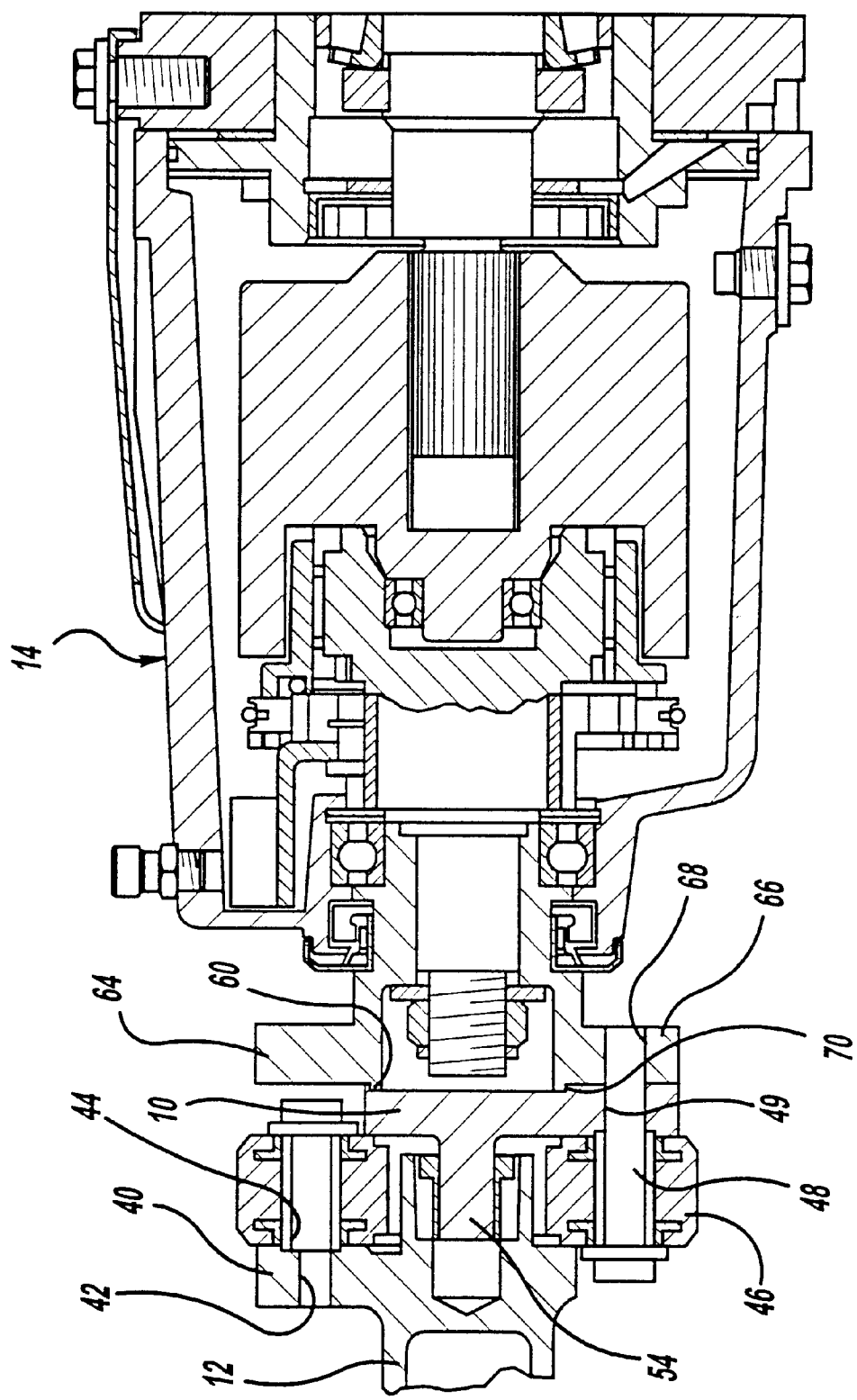
FIG. 2 shows a cross section of a driveline connected with the present invention.
Figure 3:
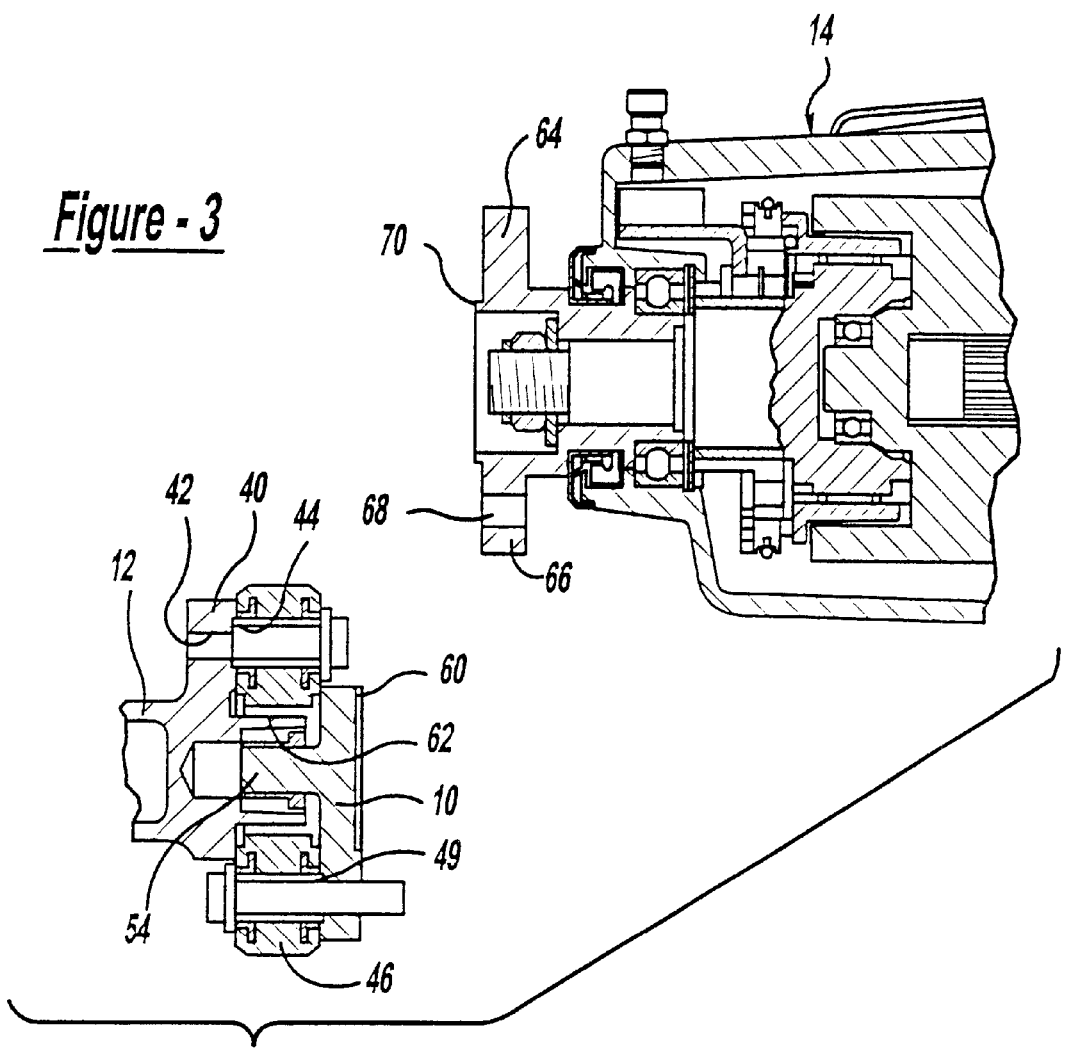
FIG. 3 shows a cross section of a driveline prior to installation with the integrated centering flange of the present invention.

The mounting system according to the present invention is shown in FIGS. 2–6. FIGS. 2 and 3 show a propshaft 12 and driveline module 14 in cross section according to the present invention. Generally, the propshaft 12 is hollow to reduce the weight and increase the gas mileage for the automotive vehicle. The propshaft 12 includes a flange 40 on one end thereof. The flange 40 in the preferred embodiment, has three lobes, with each lobe having an orifice 42 through a center point thereof. The flange 40 also has, at a center point, a cavity 14 that is generally circular. In contact with and secured to the side of the flange 40 is a flexible coupling 46 that generally has a ring like shape. The flexible coupling 46 is made of a rubber material that has a plurality of orifices 48, lined with a metallic material there through. In the preferred embodiment the flexible coupling 46 has a total of six orifices 48 equidistantly spaced around the circumference of the ring of the flexible coupling 46. Every other orifice 48 of the flexible coupling 46 is used to connect with a corresponding orifice 42 of the propshaft flange 40. In the preferred embodiment a bolt is used but any other securing device maybe used to connect the flexible coupling 46 with the propshaft flange 40. The propshaft flange 40 on its outer side surface includes a circular cavity 44 around each orifice of the lobe. The flexible coupling 46 has a tube like insert 49 that mates with the circular cavity 44 of the propshaft flange 40 to ensure proper location and centering of the flexible coupling 46 to the propshaft flange 40.

Figure 4:
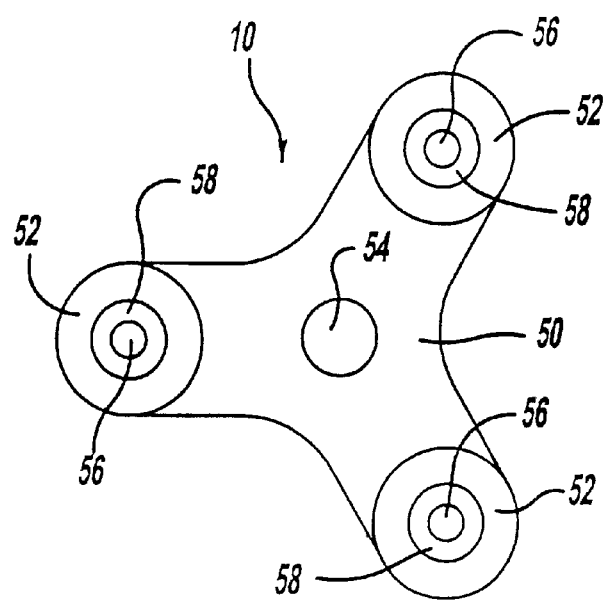
FIG. 4 shows a top view of the centering flange according to the present invention.

An integrated centering flange 10, which is generally made of a metal material, is attached to the flexible coupling 46 on a side opposite from the propshaft flange 40. FIG. 4 shows a side view of the integrated centering flange 10 according to the present invention. The integrated centering flange 10 generally has a body 50 that has a plurality of lobes 52 extending from the body 50. In the preferred embodiment there are three lobes 52 that extend from the body 50 of the integrated centering flange 10, however any other number of lobes may also be used. A pole or appendage 54 extends from one side of the integrated centering flange 10. The lobes 52 are equidistantly space around the perimeter of the body 50 of the integrated centering flange 10. At a center point of each lobe 52 is located an orifice 56 there through. Each lobe 52 also includes a circular channel 58 centered about the orifice 56 of each lobe. It should be noted that the lobes 52 are generally circular in appearance when viewed from the side. The integrated centering flange 10 also includes a circumferential recess 60 on a side of the integrated centering flange 10 opposite of the pole 54.

FIG. 3 shows the pole 54 of the integrated centering device 10 interacting with and mating with a notch 62 of the propshaft flange 40. The circular channels 58 of the lobes 52 of the integrated centering flange 10 also interact and mate with the inserts 49 that extend from the side of the flexible coupling 46. This will allow for proper location of the integrated centering flange 10 to the side of the flexible coupling 46. Engaged with the opposite side of the integrated centering flange 10 away from the flexible coupling 46 is a housing coupling or flange 64 which is rotatably supported within the driveline module 14. The housing flange 64 generally has a plurality of lobes 66 that interact with the lobes 52 of the integrated centering device 10. In the preferred embodiment the housing 64 flange has three lobes 66 that mate with and align with the lobes 52 of the centering flange 10. The housing flange 64 has orifices 68 through each lobe 66 which align with and mate with the orifice 52 of the integrated centering device 10 by any known securing device. The housing flange 60 has a circular knob 70 extending from a center point thereof. The circular knob 70 mates with and aligns with the circumferential recess 60 on the side of the integrated centering flange 10. This mating will properly align the integrated centering flange 10 with the housing flange 64 and allow for a securing device to be place through the flexible coupling 46 then through the integrated centering device 10 and finally through the housing flange 64. A total of three securing devices, in the preferred embodiment bolts, are used to secure the flexible coupling 46 to the integrated centering device 10 and to the housing flange 64 in an alternating pattern to those connecting the flexible 46 coupling to the propshaft 12 and/or the integrated centering flange 10 using the unused three orifices of the flexible coupling 46.

Figure 5:
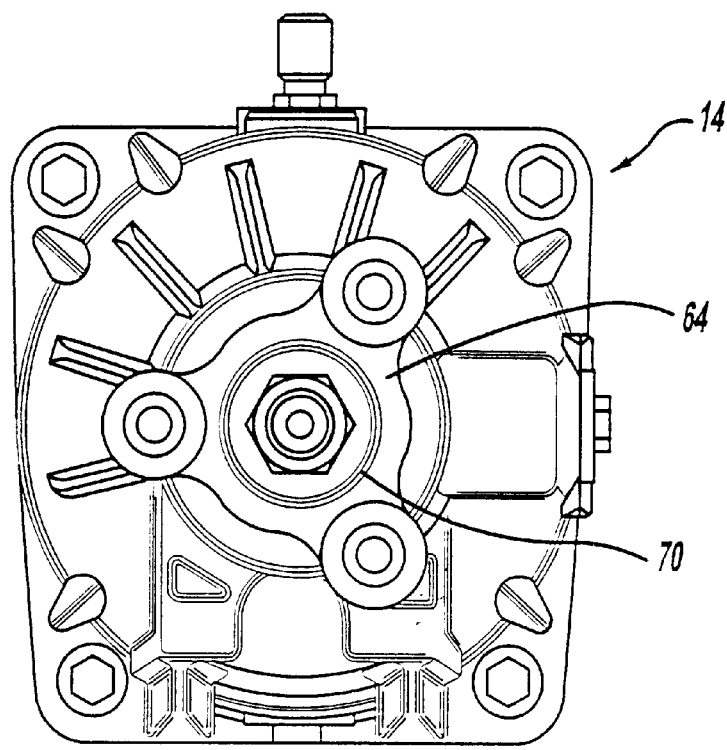
FIG. 5 shows a side view of the driveline module with a centering flange according to the present invention attached thereto.

FIG. 3 shows the propshaft 12 with the flexible coupling 46 attached thereto prior to installation with the driveline module 14. FIG. 2 shows the propshaft 12 connected to the driveline module 14 via the flexible coupling 46, the integrated centering device 10 and the housing flange 64. It should be noted that to the present inventions mounting system has reduced the complexity of attaching the propshaft 12 to the driveline module 14. The integrated centering flange 10 is attached to the flexible coupling 46, and the propshaft 12 prior to installation with the driveline module 14. This removes the need for the prior art centering appendage that was attached to the housing flange. The centering of the propshaft 12 to the driveline module 14 is accomplished by the integrated centering flange 10. The centering in the present invention is achieved by the mating and interaction of circumferential recess 60 with the knob 70 extending from the housing flange 64. This allows for easier assembly of the propshaft 12 to the driveline module 14, by not requiring the assemblers to hold the propshaft 12 at a great angle to allow for proper centering of the propshaft 12 to the driveline module 14. In the preferred embodiment the propshaft 12 can be lifted in a nearly parallel direction to the driveline module 14 and then slipped onto the knob 70, thus aligning the orifice of the housing flange 64 with the flexible coupling orifices to allow for simple installation of the propshaft 12 to the driveline module 14. The new integrated centering flange 10 also reduces the packaging difficulties associated with the prior art design. The new integrated centering flange 10 reduces the amount of time necessary to assemble the drive train components and also reduces the difficulties of the assembly process by removing any need for inserting the propshaft 12 at an angle FIG. 5 shows a side view of the driveline module 14 according to the present invention. It shows the three arm housing coupling 64 used to connect to the integrated centering flange 10. The knob 70 extending from the housing flange 64 is shown centered about the center point of the housing flange 64. The preferred three lobe housing flange 64 is also pictured attached to the center point of the driveline module 14.

Figure 6:
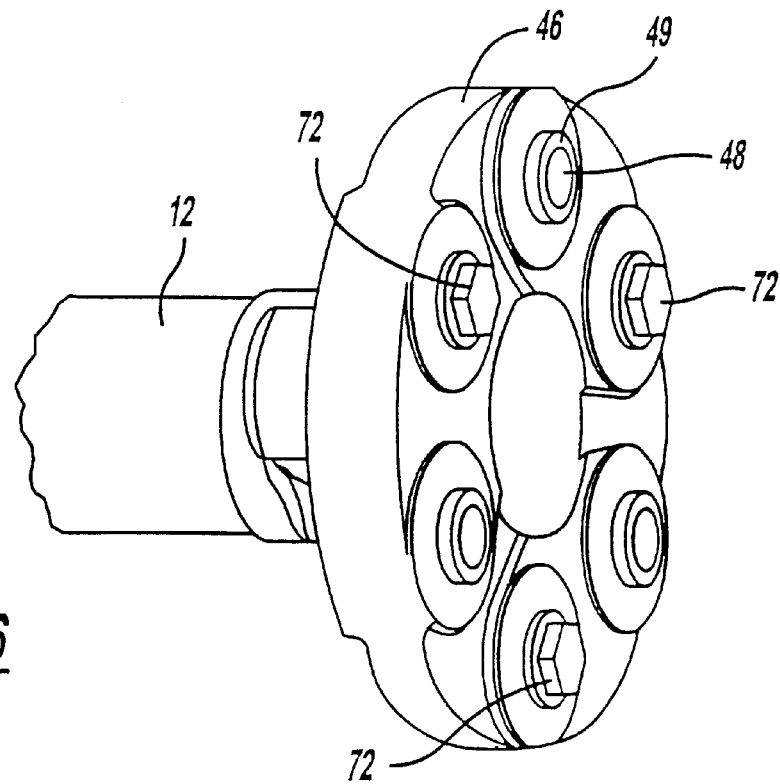
FIG. 6 shows a propshaft with a flexible coupling attached to one end thereof.

FIG. 6 shows a side view of the propshaft 12 that shows the flexible coupling 46 attached to the propshaft flange by the three bolts 72 which are arranged from the flexible coupling 46 through into the flange 40 of the side shaft 12. The three bolts used to connect the flexible coupling 46 to the housing flange 64 are placed through the flexible coupling 46 and then through the integrated centering flange 10 and finally secured into the housing flange 64 from an opposite direction. Therefore, the integrated centering flange 10 will reduce installation difficulties and costs along with frustration of assembly line workers from properly installing, in the required amount of time, the driveline systems into to an automotive vehicle.

The present invention has been described an in illustrative manner. It is to be understood that the terminology which has been used is intended to be in the nature of words of description rather than of limitation.

Any modifications and variations of the present invention are possible in light of the above teaching. Therefore, within the scope of the appended claims, the present invention maybe practiced otherwise then as specifically described.

What is claimed is:

1. A driveline mount system for a vehicle having a propshaft and housing, said mount system including:

a flexible coupling secured to an end of the propshaft;

a centering flange secured to said flexible coupling on a side opposite of the propshaft, said centering flange having a circumferential recess on one side thereof and an appendage extending from a side opposite of said circumferential recess wherein said appendage is received in an orifice of said propshaft; and a housing flange rotatably supported in the housing, said housing flange secured to said centering flange on a side opposite of said flexible coupling.

* * * * *

UNITED STATES PATENT AND TRADEMARK OFFICE
CERTIFICATE OF CORRECTION

PATENT NO.    : 6,561,911 B2
DATED         : May 13, 2003
INVENTOR(S)   : Ramon C. Kuczera It is certified that error appears in the above-identified patent and that said Letters Patent is hereby corrected as shown below:

Column 5,
Line 22, delete "place" and insert -- placed --

Column 6,
Line 8, insert a period at the end of the line

Signed and Sealed this

Eighth Day of July, 2003

JAMES E. ROGAN
*Director of the United States Patent and Trademark Office*